United States Patent [19]
Degen

[11] Patent Number: 5,500,167
[45] Date of Patent: Mar. 19, 1996

[54] METHOD OF PREPARING A SUPPORTED MICROPOROUS FILTRATION MEMBRANE

[75] Inventor: Peter J. Degen, Huntington, N.Y.

[73] Assignee: Pall Corporation, East Hills, N.Y.

[21] Appl. No.: 451,184

[22] Filed: May 26, 1995

Related U.S. Application Data

[62] Division of Ser. No. 91,152, Jul. 12, 1993, Pat. No. 5,433,859.

[51] Int. Cl.$^6$ .............................. B29C 65/00; B01D 29/00
[52] U.S. Cl. ...................... 264/41; 210/490; 210/500.38; 210/500.36; 210/508; 210/500.42; 427/245; 427/294; 427/402.1
[58] Field of Search ............................. 210/490, 500.38, 210/500.36, 508, 493.1, 490, 489, 483, 500.42, 500.21; 427/244, 245, 294, 407.1; 264/41, 134

[56] References Cited

U.S. PATENT DOCUMENTS

| | | | |
|---|---|---|---|
| 599,030 | 2/1898 | Wesener | 210/508 |
| 3,876,738 | 4/1975 | Marinaccio et al. | 264/41 |
| 3,988,245 | 10/1976 | Wang | 264/41 |
| 4,207,182 | 6/1980 | Marze | 210/490 |
| 4,214,020 | 7/1980 | Ward et al. | 210/490 |
| 4,214,994 | 7/1980 | Kitano et al. | 210/490 |
| 4,288,475 | 9/1981 | Meeker | 427/294 |
| 4,340,479 | 7/1982 | Pall | 210/490 |
| 4,340,480 | 7/1982 | Pall et al. | 264/41 |
| 4,518,466 | 5/1985 | Takahashi et al. | 427/434.2 |
| 4,595,503 | 6/1986 | Schindler et al. | 210/500.38 |
| 4,623,463 | 11/1986 | Ford et al. | 210/500.29 |
| 4,645,602 | 2/1987 | Barnes, Jr. et al. | 210/490 |
| 4,707,265 | 11/1987 | Barnes, Jr. et al. | 210/638 |
| 4,767,643 | 8/1988 | Westervelt et al. | 427/294 |
| 4,770,777 | 9/1988 | Steadly et al. | 210/490 |
| 4,776,959 | 10/1988 | Kasai et al. | 210/490 |
| 4,788,226 | 11/1988 | Curry | 210/500.38 |
| 4,795,559 | 1/1989 | Shinjou et al. | 210/490 |
| 4,863,604 | 9/1989 | Lo et al. | 210/500.36 |
| 4,876,007 | 10/1989 | Naruo et al. | 210/339 |
| 4,894,157 | 1/1990 | Johnson | 210/490 |
| 4,904,385 | 2/1990 | Wessling et al. | 210/490 |
| 4,933,082 | 6/1990 | Yamada et al. | 210/490 |
| 4,933,083 | 6/1990 | Jones, Jr. | 210/490 |
| 4,935,141 | 6/1990 | Buck et al. | 210/500.38 |
| 4,954,256 | 9/1990 | Degen et al. | 210/490 |
| 4,981,590 | 1/1991 | Van'T Veen et al. | 210/490 |
| 4,983,288 | 1/1991 | Karvachsch et al. | 210/490 |
| 5,228,994 | 7/1993 | Tkacik et al. | 210/500.29 |
| 5,433,859 | 7/1995 | Degen | 210/651 |

FOREIGN PATENT DOCUMENTS

WO93/23153  11/1993  WIPO.

OTHER PUBLICATIONS

Pall et al., "Particulate Retention by Bacteria Retentive Membrane Filters," *Colloids and Surfaces*, 1, 235–256 (1980).

*Primary Examiner*—Ana M. Fortuna
*Attorney, Agent, or Firm*—Leydig, Voit & Mayer, Ltd.

[57] ABSTRACT

The present invention provides a supported microporous filtration membrane comprising a porous nonwoven fibrous support material having first and second sides, and a continuous microporous membrane having first and second zones, wherein the first side of the support material is integral with the first zone while not protruding into the second zone, and the first zone has a pore size at least about 50% greater than the pore size of the second zone. A method of preparing such a supported microporous membrane is also provided by the present invention.

13 Claims, 2 Drawing Sheets

METHOD OF PREPARING A SUPPORTED MICROPOROUS FILTRATION MEMBRANE

CROSS-REFERENCE TO RELATED APPLICATION

This patent application is a divisional of patent application Ser. No. 08/091,152, filed Jul. 12, 1993, now U.S. Pat. No. 5,433,859.

TECHNICAL FIELD OF THE INVENTION

The present invention relates to supported microporous filtration membranes and methods for their preparation.

BACKGROUND OF THE INVENTION

Microporous membranes have been prepared for several years. U.S. Pat. No. 4,340,479 generally describes the preparation of skinless microporous membranes by casting a polymer resin solution onto a substrate and quenching the resulting thin film of polymer.

While these membranes are suitable for a variety of purposes, they suffer from several disadvantages. In particular, such membranes are relatively fragile. In order to impart mechanical strength to such membranes, they are usually mated to nonwoven fibrous support material; however, casting the polymer resin solution onto such material is not without difficulties and problems. The substrate preferably has a large pore size to minimize the pressure drop across the supported membrane and coarse fibers to provide the greatest mechanical strength. Substrate pores which are too large, however, lead to gaps or holes in the membrane coating on the support, and increasing fiber coarseness results in increasing fiber stiffness and the possibility of membrane damage during the physical manipulations of the supported membrane needed to prepare, for example, a filter element such as a filter cartridge.

Moreover, in the coating process, there are invariably fibers extending from the main mass of the fibers which form the support material, Thus, the membrane is not formed upon an entirely smooth surface, and the thickness of the membrane layer must be increased to ensure that all such extending fibers and any defects in the membrane layer introduced by such extending fibers are completely covered by sufficient unbroken membrane to yield the desired filtration characteristics.

Attempts at avoiding some of these problems by separately forming the membrane and then laminating it to a suitable support material, typically by the application of heat thereto, have not been entirely successful. While lamination is capable of adequately addressing many of the structural and processing deficiencies of microporous membranes, other problems are introduced by this methodology. The most significant problem is the potential for subsequent delamination of the membrane. This problem is of particular concern when a membrane is cleaned for reuse by back-flushing the filtration system. Another problem with lamination relates to the potential effect the lamination procedure has upon the pore structure of the membrane. When heat is used to effect lamination, the increase in temperature can damage the membrane by altering the structure or pore size of the membrane at its surface. Such pore size alterations can affect the resolution and/or useful life of the membrane. As a result, laminated microporous membranes are not entirely desirable, and membranes formed directly on suitable support materials are more typically used, albeit with certain compromises.

In order to compensate for as many of the aforementioned problems as possible, commercially available skinless microporous membranes generally utilize a relatively thick nonwoven fibrous support material with fine pores and fine fibers with a membrane layer of substantial thickness encompassing the entire support material, i.e., the support material is entirely embedded in the membrane. The resulting supported microporous membrane is generally satisfactory for its intended purposes but is rather thick and exhibits a high pressure drop. Moreover, in critical applications, such as in removing bacteria, viruses, and other harmful contaminants from pharmaceutical products, two such microporous membranes are typically used in series to ensure that the expected removal of the contaminants, referred to as titer reduction, is actually achieved. The use of two or more membranes in series, however, results in significantly higher pressure drops.

There has been some effort at preparing skinned microporous membranes which differ from the aforementioned skinless membranes in having a dense skin penetrated by pores of smaller diameter than the pores in the remainder of the membrane. Such skinned microporous membranes are disclosed, for example, in U.S. Pat. No. 3,876,738. Such skinned membranes can be considered to comprise the skin which provides the primary sieving action and a backing layer which is that portion of the membrane which has not formed the skin and has a larger pore size than the pores penetrating the skin. These skinned membranes, however, suffer from at least the same difficulties and problems as the skinless microporous membranes discussed above and can exhibit even higher pressure drops and other poor filtration characteristics. U.S. Pat. No. 4,595,503 attempts to improve the strength and pore size of such skinned microporous membranes by stretching the membranes in at least one direction prior to drying them; however, such stretching can easily result in unacceptably large pores or tears.

In an attempt to avoid that particular problem, U.S. Pat. No. 4,770,777 discloses a somewhat different process of preparing a supported skinned microporous membrane, but the disclosed process does not cure all of the problems attendant skinned microporous membranes. The process involves casting a first membrane layer onto a solid support which is subsequently separated from the first membrane layer, embedding a fabric support into that first membrane layer to form a first membrane layer/fabric support composite, and casting a second membrane layer on top of the first membrane layer/fabric support composite to form a sandwich-like composite. The thus prepared supported skinned microporous membrane, however, suffers from same disadvantages as other skinned microporous membranes with respect to high pressure drop and other poor filtration characteristics.

In particular, significant defects in the form of, for example, macrovoids, cracks, pinholes, and other defects and imperfections that either breach the skin layer or lead to failure upon use, can be present in the membranes. The presence of such defects in the skin can result in a membrane which is rated for the removal of materials of a certain size, but which nevertheless allows for a portion of such material to pass through the membrane upon use. Further, such skinned membranes possess a low level of structural integrity and are easily fouled by debris.

Accordingly, there exists a need for a microporous membrane which is able to provide a high level of structural integrity without a significantly increased pressure drop across the membrane. Moreover, such a membrane should also provide relatively high and uniform titer reduction and, in addition, be substantially defect-free so as to minimize the potential for failure during use.

The present invention provides such a supported microporous membrane which exhibits a high titer reduction, low pressure drop, lack of defects, and good structural integrity. The present invention also provides a method for preparing such a membrane. These and other advantages of the present invention, as well as additional inventive features, will be apparent from the description of the invention provided herein.

BRIEF SUMMARY OF THE INVENTION

The present invention provides a supported microporous filtration membrane comprising a porous nonwoven fibrous support material having first and second sides, and a continuous microporous membrane with first and second layered zones. The first side of the support material is integral with the first zone while not protruding into the second zone, and the first zone has a pore size at least about 50% greater than the pore size of the second zone.

The present invention further provides a method of preparing such a supported microporous filtration membrane. The method comprises providing a porous nonwoven fibrous support material having first and second sides, applying a first casting solution onto the first side of the support material to form a first casting solution layer having a substantially smooth surface, applying a second casting solution onto the substantially smooth surface of the first casting solution layer to form a second casting solution layer prior to the complete formation of a membrane from the first casting solution, and forming a continuous microporous membrane having first and second zones from the first and second casting solutions such that the first side of the support material is integral with the first zone while not protruding into the second zone, and the first zone has a pore size at least about 50% greater than the pore size of the second zone.

DESCRIPTION OF THE PREFERRED EMBODIMENTS

Figure 1B:
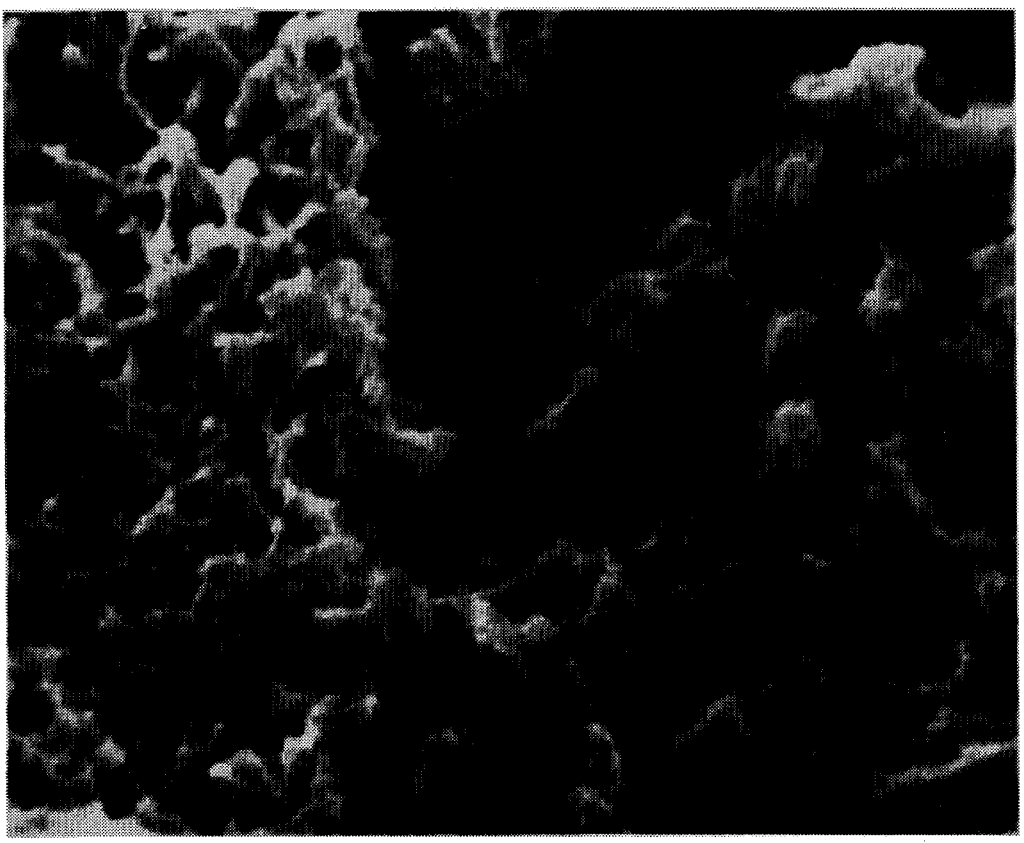
FIG. 1 is a scanning electron micrograph of a supported microporous filtration membrane of the present invention which illustrates the interface between the two porous zones of the membrane at 600× (FIG. 1A) and at 6000× (FIG. 1B).

The present invention provides a supported microporous filtration membrane comprising a porous nonwoven fibrous support material and a continuous microporous membrane. The support material has first and second sides, while the microporous membrane has first and second layered zones. The first side of the support material is integral with the first zone of the microporous membrane while not protruding into the second zone of the microporous membrane, and the first zone has a pore size at least about 50% greater than the pore size of the second zone.

The present inventive supported microporous filtration membrane has a high efficiency (as measured by titer reduction) and a high level of structural integrity with a significantly lower pressure drop, as compared to conventional supported filtration membranes of similar porosity. These results are believed to be achieved as a result of the first zone of the continuous membrane (which is integral with the support material) acting as a smooth-surfaced, homogeneous, low pressure drop substrate material itself and the second zone of the microporous membrane (layered on top of the first zone) serving as the component which determines filtration efficiency or titer reduction.

The porous nonwoven fibrous support material may be prepared from any suitable material in any suitable manner. The support material should provide the membrane with sufficient strength to withstand the flow pressures encountered during use without deforming to the extent that the microporous membrane is damaged. The support material preferably comprises polyester, polypropylene, polyethylene, or polyamide. The support material used in conjunction with the present invention is preferably formed from fibers with as large a diameter as possible so as to provide a high degree of structural integrity and low pressure drop, while not so large that subsequent mechanical manipulations of such fibers may cause damage to the microporous membrane which, with the support material, forms the present inventive supported microporous membrane. Most preferably, the support material will utilize fibers of about 20–25 μm diameter to provide an average pore size of about 50–100 μm.

The first zone of the microporous membrane preferably possesses pores which are as large as possible consistent with providing a smooth surface for the second zone. The first zone should have an average size of at least about 50% greater than the average size of the pores in the second zone, preferably at least about 100% greater than the average size of the pores in the second zone, more preferably at least about 200% greater than the average size of the pores in the second zone. The pores in the first zone will generally have a size ranging from about 0.5 μm to about 10 μm, preferably about 0.5 μm to about 2 μm. The pore size distribution of the first zone is preferably quite narrow, most preferably similar to the pore size distribution of the second zone, although this is not essential for satisfactory performance. The first zone should be as thin as possible so long as it provides the desired structural strength and covers the entire first side of the support material such that no fibers of the support material protrude through the first zone and into the second zone. The thickness of this zone will be typically about 50 μm to about 200 μm and preferably about 75 μm to about 125 μm.

The second zone possesses pores which have a size providing the desired filtration efficiency or titer reduction. Generally, the pores of the second zone will be about 1 μm or less, typically ranging from about 0.01 μm to about 1 μm. More preferably, the pores of the second zone will range in size from about 0.02 μm to about 0.5 μm. The pore size distribution of the second zone will be quite narrow. The microporous membrane preferably exhibits substantially the same diffusive flows at pressures 70% and 85% of $K_L$, i.e., the $K_L$ curve has a rather sharp inflection point. In absolute terms, the diffusive flows at pressures 70% and 85% of $K_L$ are preferably less than 10 cc/min/sq. ft. membrane surface area and most preferably less than 5 cc/min/sq. ft. membrane surface area. The generation of a $K_L$ curve is discussed in U.S. Pat. No. 4,340,479. A similar curve, termed the $K_{UF}$ curve, useful for microporous membranes of very low pore size can be similarly used to measure pore size distribution. The generation of a $K_{UF}$ curve is discussed in U.S. patent application Ser. No. 07/882,473, filed May 13, 1992. The second zone preferably is as thin as possible to minimize the pressure drop across the microporous membrane while being sufficiently thick to yield the desired titer reduction in accordance with the relationship between thickness and titer reduction as set forth in U.S. Pat. No. 4,340,479. The thickness of the second zone will typically range from about 10 μm to about 250 μm, preferably from about 25 μm to about 125 μm.

While at least the first side of the support material is integral with the first zone of the microporous membrane, the second side of the support material may be also integral with the first zone of the microporous membrane. In other words, the entire support material may be embedded in the first zone of the microporous membrane to ensure that none of the support material is separated from the remainder of the supported microporous membrane during use, particularly during backwashing. Preferably, however, the second side of the support material is not integral with the first zone of the microporous membrane, i.e., the entire support material is not embedded in the first zone of the microporous membrane. More preferably, all but a portion of the support material, specifically, all but a layer having a thickness of at least about 50 μm on the second side of the support material, is integral with the first zone of the microporous membrane.

The embodiment of the present invention wherein the second side of the support material is not integral with the first zone of the microporous membrane is particularly useful when the present inventive supported microporous filtration membrane is pleated, e.g., in a cartridge filter element comprising a housing and the present inventive supported microporous filtration membrane which has been formed into a plurality of pleats. In such a pleated configuration, the low flow resistance of the fibrous nonwoven support material of the second side of the supported membrane will ensure that the filtered fluid passing through the supported microporous filtration membrane in the area of the pleats will not be unduly hindered in passing between adjoining pleats, i.e., will not have a significant adverse impact on the pressure drop across the filtration element or on filtration fluid holdup volume. Thus, the second side of the support material can replace the separate drainage or separation material which is conventionally mated with pleated filtration membranes in cartridge filter elements and the like which employ filtration membranes in pleated configurations.

The present invention further provides a method of preparing a supported microporous filtration membrane. The method comprises providing a porous nonwoven fibrous support material having first and second sides, applying a first casting solution onto the first side of the support material to form a first casting solution layer having a substantially smooth surface, applying a second casting solution onto the substantially smooth surface of the first casting solution layer to form a second casting solution layer prior to the complete formation of a microporous membrane from the first casting solution, and forming a continuous microporous membrane having first and second zones from the first and second casting solutions such that the first side of the support material is integral with the first zone while not protruding into the second zone, and the first zone has a pore size at least about 50% greater than the pore size of the second zone.

The supported microporous membrane can be prepared in any suitable manner, preferably in general accordance with the disclosure in U.S. Pat. No. 4,340,479. Thus, the casting solutions, quench baths, and general membrane-forming procedures are conventional in nature with a few exceptions. The membrane formation will necessarily take place in two steps with the first casting solution being laid down on the support material followed by the second casting solution. The membrane comprising both first and second layers is then quenched simultaneously in the same quench bath. Since the first layer is more coarse, it will coagulate more slowly, allowing for the formation of a continuous microporous membrane having the first and second zones as previously described. The present invention is applicable to any polymer suitable for the formation of a microporous membrane such as any of the many polyamides, as well as polyvinylidene fluoride, polysulfone, and polyethersulfone.

While the present inventive method may be carried out in any suitable manner, the support material will typically be transported to a headbox which is configured so as to sequentially apply two casting solutions onto the material. Specifically, this headbox will apply a first casting solution onto the first (or upper) side of the support material to form a first casting solution layer substantially covering the first side of the support material such that no fibers of the support material protrude through the first casting solution layer and that a substantially smooth surface is provided for the laydown of the second casting solution layer. The combination of a substantially smooth and defect-free surface is a significant factor in providing a second microporous zone which is itself substantially uniform in thickness and defect-free.

The smoothness of the first casting solution layer can be affected by the viscosity of the first casting solution. The first casting solution should have a viscosity which is adequate to provide for a substantially smooth surface which will remain so even after application of the second casting solution thereon. Accordingly, the viscosity of the first casting solution should be at least about 250 centipoise, preferably at least about 500 centipoise, and most preferably at least about 1000 centipoise.

When the first casting solution is applied onto the support, air will often be present in that solution. If left in the solution, these air bubbles will introduce defects into the surface of the membrane formed therefrom. Such air bubbles may be removed from the solution in any suitable manner. Preferably, the support material and first layer are subjected to a vacuum such that the first casting solution is rendered substantially free of air. In particular, the second side of the support material is preferably passed over a vacuum slit in order to draw the first casting solution from the first side of the support material down into the support material and, at the same time, remove the air from the first casting solution.

After the first casting solution is applied onto the support material, the thus coated support material is passed through a means which is capable of regulating the thickness of the first casting solution layer and ensuring that a smooth surface is provided for the laydown of the second casting solution. This can be accomplished by any conventional means, including, for example, a roller or doctor blade. The use of a doctor blade for this purpose is preferred.

The second casting solution is then substantially immediately applied to the top of the first casting solution layer. The thickness of this second casting solution layer is similarly controlled by any conventional means, including, for example, a roller or doctor blade, although the use of a doctor blade for this purpose is preferred.

Figure 1A:
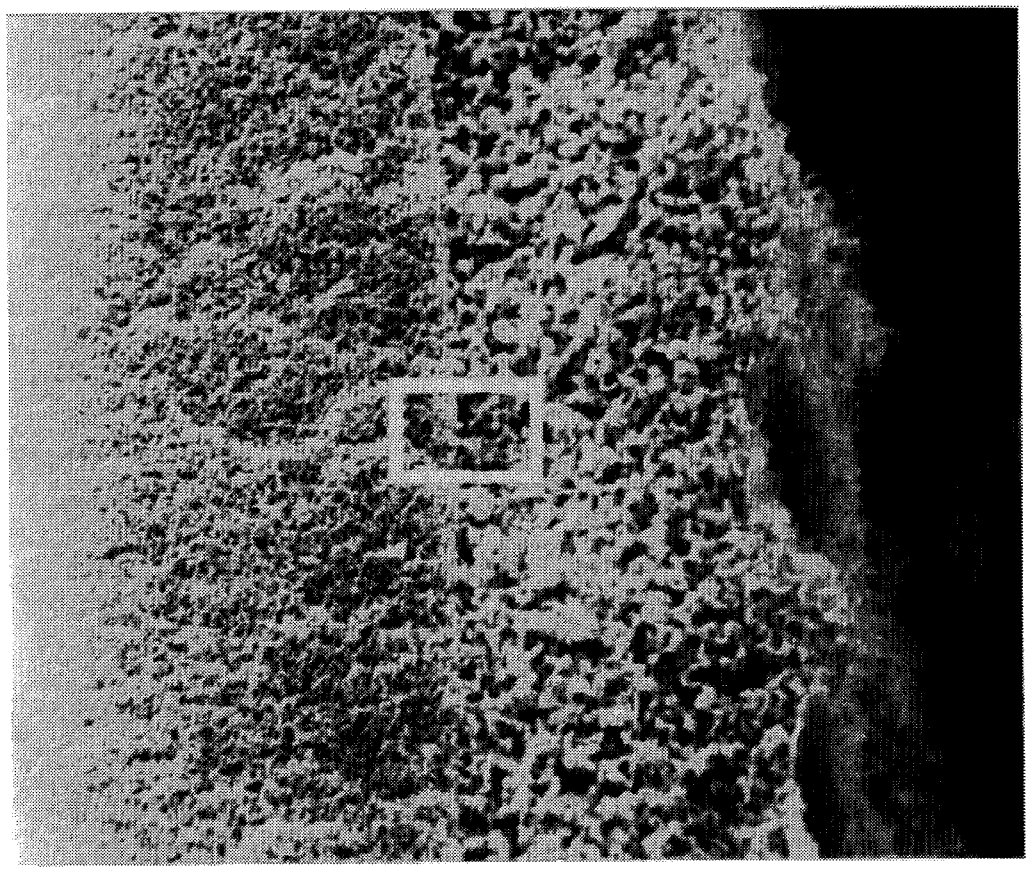
Figure 2:
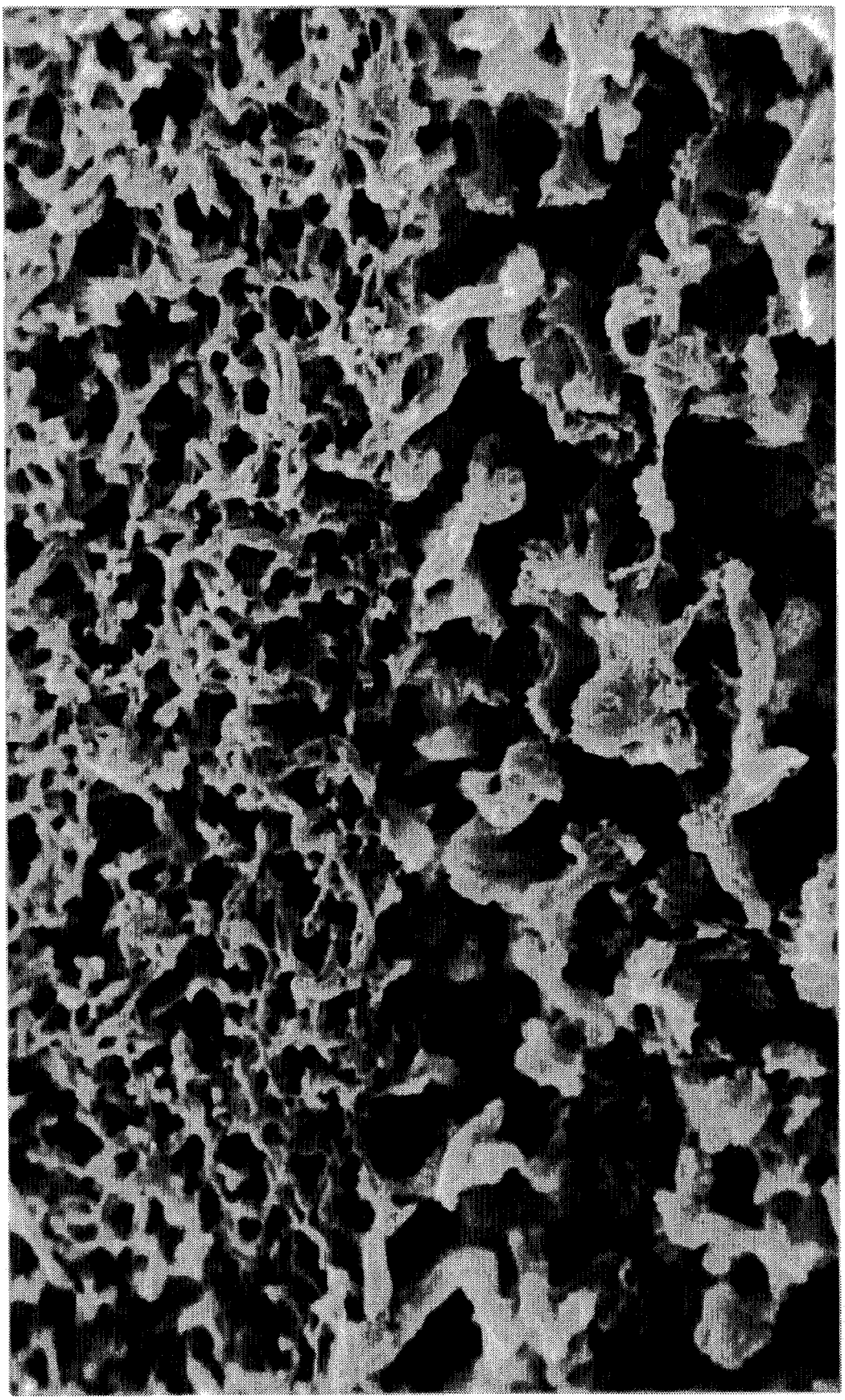
FIG. 2 is a scanning electron micrograph of a supported microporous filtration membrane of the present invention which illustrates the interface between the two porous zones of the membrane at 5000×.

The combined first and second casting solution layers are then quenched using conventional procedures, e.g., by passing them into a quenching bath. A continuous microporous membrane having first and second zones is formed from the first and second casting solution layers, with each zone having a particular, but different, average pore size within a narrow pore size distribution. The microporous membrane is continuous in the sense that a continuum exists between the zones, with there being no break between the polymer structure which comprises the first zone and that which comprises the second zone, yet there is an abrupt change in pore size between the two zones. The interface between the two zones is shown in the scanning electron micrographs of FIGS. 1 and 2. FIG. 1A shows the interface between the two zones in a microporous membrane of the present invention at 600× magnification, while FIG. 1B shows the indicated rectangular area of FIG. 1A at 6000× magnification. FIG. 2 shows the interface between the two zones in yet another microporous membrane of the present invention at 5000× magnification. The continuum of the microporous membrane according to the present invention is to be contrasted with the transition that exists between two fully-formed porous membranes of differing porosity which have been laminated together.

The following examples further illustrate the present invention but, Of course, should not be construed as in any way limiting its scope as defined by the claims.

EXAMPLE 1

This example illustrates the advantages attendant the present inventive supported microporous membranes as compared with similar conventional membranes.

Two supported microporous membranes (Samples A and B) were prepared in accordance with the present invention, and their properties were determined and compared with commercially available membranes (Pall Ultipor® N66 and Millipore GVWP). The results of the comparison are set forth below.

The pore rating is the nominal pore rating, while $K_L$ was determined in accordance with U.S. Pat. No. 4,340,479. Tear resistance was determined using a modification of ASTM D1004-61 wherein test specimens were cut as 0.75 inch×4 inch pieces with the center of one of the long edges notched with a 30° "V" notch to a depth of ⅛ inch. The samples were drawn on a standard tensile tester at 2 inches per minute to obtain the tear strength. The tear strength and related physical properties are a measure of a membrane's ruggedness and its ability to withstand manufacturing procedures needed to convert the membrane into elements of high integrity, particularly for the removal of bacteria. Also, membrane ruggedness is required to withstand normal use conditions which include large hydraulic pulses which can cause failure in a weak membrane.

TABLE 1

| Sample | Pore Rating (μm) | Type | $K_L$ (psi) | Thickness (mils) | Pressure Drop (in. Hg at 28 fpm air flow) | Titer Reduction (Ps. dim.) | Tear Resistance (lb) |
| --- | --- | --- | --- | --- | --- | --- | --- |
| Sample A | 0.2 | supported | 53 | 7.8 | 9.5 | >1.5 × 10$^{10}$ | not determined |
| Sample B | 0.2 | supported | 52 | 7.5 | 7.5 | 2 × 10$^{11}$ | 5.0 |
| Ultipor ® N66 | 0.2 | supported | 52 | 5.4 | 12.7 | >2 × 10$^{10}$ | 7.2 |
| Ultipor ® N66 | 0.8 | supported | 18 | 5.8 | 2.6 | negligible | not determined |
| Ultipor ® N66 | 0.2 | unsupported | 48 | 3.0 | 9.5 | >2 × 10$^{10}$ | 0.62 |
| Millipore GVWP | 0.2 | unsupported | 43 | 4.5 | 11.0 | >2 × 10$^{10}$ | 2.8 |

As is apparent from the obtained data, the present inventive supported microporous membranes provide for the combination of a high titer reduction and high mechanical strength at significantly reduced pressure drops. The commercially available microporous membranes of similar porosity must trade off pressure drop against mechanical strength to achieve desirable titer reductions.

EXAMPLE 2

This example illustrates that the present inventive supported microporous membranes possess desirable bacteria titer reduction characteristics.

Supported microporous membranes were prepared in accordance with the present invention, and three samples (indicated as 1, 2, and 3) of each of five membranes (indicated as A, B, C, D, and E) were tested using a 1× 10$^8$g/cm$^2$ P. diminuta (0.20 μm) bacterial challenge solution at 40 psi under a variety of total challenge conditions. The forward flow rates before and after the challenge, the total challenge, total recovery, and titer reduction were determined for fifteen 142 mm disc samples of the present inventive membranes. The results of these tests are set forth below.

TABLE 2

| Sample | Pre-Forward Flow (cc/min) | Post-Forward Flow (cc/min) | Total Challenge (cfu) | Total Recovery | Titer Reduction |
| --- | --- | --- | --- | --- | --- |
| A1 | 0.10 | 0.08 | 3.4 × 10$^{10}$ | 0 | >3.4 × 10$^{10}$ |
| A2 | 0.12 | 0.14 | 3.4 × 10$^{10}$ | 0 | >3.4 × 10$^{10}$ |
| A3 | 0.10 | 0.12 | 3.4 × 10$^{10}$ | 0 | >3.4 × 10$^{10}$ |

TABLE 2-continued

| Sample | Pre-Forward Flow (cc/min) | Post-Forward Flow (cc/min) | Total Challenge (cfu) | Total Recovery | Titer Reduction |
|---|---|---|---|---|---|
| B1 | 180 | 156 | $3.4 \times 10^{10}$ | $5.5 \times 10^6$ | $6.2 \times 10^3$ |
| B2 | 0.10 | 0.10 | $9.5 \times 10^9$ | 0 | $>9.5 \times 10^9$ |
| B3 | 0.16 | 0.10 | $9.5 \times 10^9$ | 0 | $>9.5 \times 10^9$ |
| C1 | 0.09 | 0.10 | $9.5 \times 10^9$ | 0 | $>9.5 \times 10^9$ |
| C2 | 0.05 | 0.17 | $9.5 \times 10^9$ | 0 | $>9.5 \times 10^9$ |
| C3 | 0.20 | 0.07 | $1.2 \times 10^{10}$ | 0 | $>1.2 \times 10^{10}$ |
| D1 | 0.05 | 0.40 | $1.2 \times 10^{10}$ | 0 | $>1.2 \times 10^{10}$ |
| D2 | 0.05 | 0.60 | $1.2 \times 10^{10}$ | 0 | $>1.2 \times 10^{10}$ |
| D3 | 0.12 | 0.11 | $1.2 \times 10^{10}$ | 0 | $>1.2 \times 10^{10}$ |
| E1 | 0.10 | 0.11 | $1.6 \times 10^{10}$ | 0 | $>1.6 \times 10^{10}$ |
| E2 | 0.09 | 0.20 | $1.6 \times 10^{10}$ | 0 | $>1.6 \times 10^{10}$ |
| E3 | 0.12 | 0.10 | $1.6 \times 10^{10}$ | 0 | $>1.6 \times 10^{10}$ |

As is apparent from the generated data, the present inventive supported microporous membranes are quite suitable for the filtration of bacteria from fluids. Sample no. B1 was the only sample which did not perform as expected, and it is clear from the pre-challenge forward flow value that this membrane was defective. The other membranes essentially achieved absolute titer reduction.

EXAMPLE 3.

The example illustrates the desirable narrow pore size distribution of the microporous membranes of the present invention.

Samples of the supported microporous membranes referenced in Example 2, namely of membranes A, C, and E, were subjected to forward flow testing to determine the diffusive air flow therethrough (cc/min/sq. ft. membrane surface area) at a variety of test pressures (psi). Each of the samples was tested with the fine face, i.e., the second zone, of the microporous membrane facing both upstream and downstream. The resulting data is set forth below.

TABLE 3

| Test Pressure (psi) | Sample A | | Sample C | | Sample E | |
|---|---|---|---|---|---|---|
| | upstream | downstream | upstream | downstream | upstream | downstream |
| 10 | 0 | 0 | 0 | 0 | 0 | 0 |
| 20 | 0 | 0 | 0 | 0 | 0 | 0 |
| 30 | 0 | 0 | 0 | 0 | 0 | 0 |
| 40 | 1 | 0 | 1 | 0 | 1 | 0 |
| 45 | 1 | 0 | 2 | 0 | 1 | 0.2 |
| 46 | | | | | 1 | 0.5 |
| 47 | | | | | 2 | 1.7 |
| 48 | | | | | 7 | 5.0 |
| 49 | | | | | 50 | |
| 50 | 1 | 0 | 3 | 1 | | |
| 55 | 2 | 1 | 4 | 2 | | |
| 56.5 | | | 6 | 6 | | |
| 57 | 10 | 4 | 7 | 12 | | |
| 58 | 22 | 9 | 19 | 31 | | |
| 58.5 | 55 | 12 | 31 | 50 | | |
| 59 | | 50 | 50 | | | |

The $K_L$ values of these membrane samples were also determined. The $K_L$ of samples A, C, and E were about 58, 58, and 48 psi, respectively. With the fine face of the membrane facing upstream, membrane sample A had the same flow rate of about 1 cc/min/sq ft. membrane surface area at pressures 70% and 85% of the $K_L$ values. Similarly, membrane sample C had flow rates of about 1 and 3 cc/min/sq ft. membrane surface area, respectively, at pressures 70% and 85% of the $K_L$ values, and membrane sample E had flow rates of 0 to about 1 cc/min/sq ft. membrane surface area at pressures 70% and 85% of the $K_L$ values. These values indicate that the pore size distributions of the microporous membranes prepared in accordance with the present invention were quite narrow.

All of the references cited herein, including publications, patents, and patent applications, are hereby incorporated in their entireties by reference.

While this invention has been described with an emphasis upon preferred embodiments, it will be obvious to those of ordinary skill in the art that variations of the preferred products and processes may be used and that it is intended that the invention may be practiced otherwise than as specifically described herein. Accordingly, this invention includes all modifications encompassed within the spirit and scope of the invention as defined by the following claims.

What is claimed is:

1. A method of preparing a supported microporous filtration membrane comprising providing a porous nonwoven support material having first and second sides, applying a first casting solution onto said first side of said support material to form a first casting solution layer having a substantially smooth surface, applying a second casting solution onto said substantially smooth surface of said first casting solution layer to form a second casting solution layer prior to the complete formation of a microporous membrane from said first casting solution, and forming a continuous microporous membrane having first and second zones from the first and second casting solutions such that said first side of said support material is integral with said first zone while not protruding into said second zone, and said first zone has a pore size at least about 50% greater than the pore size of said second zone.

2. The method of claim 1, which method further comprises passing said support material and first casting solution over a vacuum such that said first casting solution is rendered substantially free of air prior to applying said second casting solution layer.

3. The method of claim 2, wherein said first casting solution layer is provided with a substantially smooth surface by contacting said first casting solution layer with a doctor blade after said support material and first casting solution have passed over said vacuum.

4. The method of claim 1, wherein said second zone has a pore size of about 1 micron or less.

5. The method of claim 4, wherein said membrane exhibits substantially the same diffusive flows at pressures 70% and 85% of $K_L$.

6. The method of claim 5, wherein said second zone has a pore size of about 0.02 micron to about 0.5 micron.

7. The method of claim 6, wherein said second zone has a thickness of about 10 microns to about 150 microns.

8. The method of claim 6, wherein said first zone has a pore size of about 0.5 micron to about 10 microns.

9. The method of claim 4, wherein said membrane exhibits diffusive flows less than 10 cc/min/sq. ft. membrane surface at pressures 70% and 85% of $K_L$.

10. The method of claim 9, wherein said membrane exhibits diffusive flows less than 5 cc/min/sq. ft. membrane surface at pressures 70% and 85% of $K_L$.

11. The method of claim 1, wherein said support material is selected from the group consisting of polyester, polyethylene, polypropylene, polyamide, and polyvinylidene fluoride.

12. The method of claim 1, wherein said second side of said support material is integral with said first zone of said membrane.

13. The method of claim 1, wherein said support material is not embedded within said first zone of said membrane.

* * * * *